Patented Nov. 26, 1929

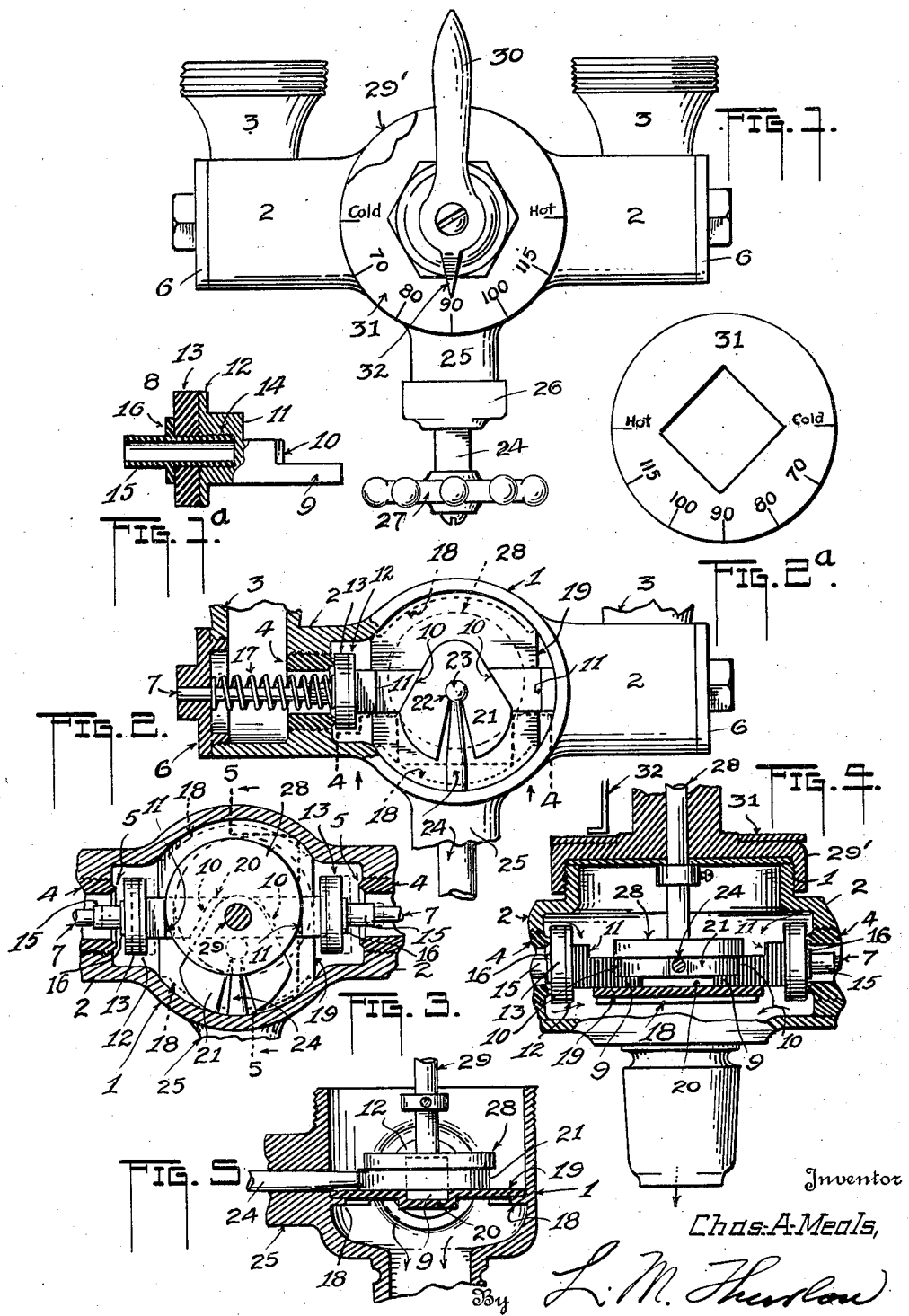

1,737,427

UNITED STATES PATENT OFFICE

CHARLES A. MEALS, OF PEORIA, ILLINOIS

FAUCET

Application filed July 7, 1928. Serial No. 291,033.

This invention relates to faucets. More particularly said invention has to do with a combination faucet for hot and cold water adaptable for use on bath tubs, showers, kitchen sinks and the like.

Specifically, the faucet is constructed and arranged to include a mixing chamber into which both hot and cold water is admitted for delivery to the place for use, and with adjustments for any desired temperatures.

An object of the invention is to provide a mixing faucet for hot and cold water wherein a member is installed having exactness of control of a hot water valve and a cold water valve whereby varying degrees of water temperatures may be had as the water issues from the device.

Another object is to furnish a faucet wherein means is employed to operate both the hot and cold water inlet valves independently of the mechanism for entirely closing said valves.

A further object lies in furnishing a pair of control members in a mixing faucet by the use of one of which the two valves of said faucet may be opened followed by the adjustment of the other member to temper the water to any desired degree.

In addition to these objects the invention lies in the arrangement of parts herein shown, or the equivalent, by which the objects sought are realized.

In the appended drawing is illustrated the faucet of my invention, it being understood that I may make slight changes while still lying within the meaning of the invention and the scope of the claims thereto.

Figure 1 is a plan of the faucet.

Figure 1ª is a side elevation of one of the valves used in the faucet.

Figure 2 is a plan of the faucet, as viewed in Figure 1, with parts removed, and parts broken away to show interior construction.

Figure 2ª is a plan of an index plate illustrated in Figure 1 showing its reverse side.

Figure 3 is a horizontal section of part of the faucet illustrating an eccentrically mounted disc or plate for adjustment of hot and cold water valves.

Figure 4 is a vertical section of the faucet taken on line 4—4 of Figure 2, and

Figure 5 is a transverse vertical section of the same on line 5—5, Figure 3.

The faucet body comprises a hollow portion 1 constituting a "mixing chamber", as it will be termed, communicating with which at each of two opposite sides is a hollow extension 2, the two extensions each having a tubular lateral stem 3 for attachment of the hot and cold water service pipes, not shown.

The extensions 2 are bored longitudinally and open into the cavity of the said mixing chamber in the portion 1, the axes of the bores lying in line with each other. The walls of the bores are provided with screw threads and into each is screwed a tubular member 4 terminating each in a valve-seat 5 facing the mixing chamber. Caps 6 close the bores at the outer ends of the extensions 2 and each cap has a guide-pin 7 lying in the axis of each bore. A valve indicated as a whole at 8 is adapted to engage upon each valve seat 5 and may comprise a body, Figure 1ª, having an extension 9. In addition, the body has a stepped form and presents two substantially vertical faces 10 and 11, the latter being set back from the former about as shown. Said body includes also a flange 12 to receive against it a valve-leather 13. Further, the body is bored and threaded at 14 and receives a tubular member 15 having a flange 16 to abut upon the leather 13, said flanges 16 and 12 serving to clamp the leather or other form of material in place. This structure which herein shall be termed a valve, as a whole, is placed in position upon the valve seat 5 through the mixing chamber, the said tubular member 15 being slipped over the guide-pin 7, the latter acting to assist in holding the valve in proper alignment so that the leather thereof can rest squarely upon the seat 5. A compression spring 17 may be placed over the pin 7 and member 15 and bear at its ends against the cap 6 and flange 16 of the valve and aid in unseating the said valve, but said spring may not be used and is shown only in Figure 2.

Within the mixing chamber on the inner wall surfaces of the portion 1 are flange portions 18, Figures 2, 3 and 5, upon which rests a plate 19. This plate has a flat upper surface, see Figure 5, but also has a groove 20, Figures 3 and 5, which extends across the plate between the valves and receives and forms a guide for the extensions 9 of the latter, Figures 4 and 5, it being noted that said plate assists the guide-pins 7 in guiding the valves. Lying upon both extensions 9 is a wedge shaped plate 21 adapted to abut at opposite edges upon the inclined edges of the vertical faces 10, said plate being slidable upon said extensions and upon the plate 19, the latter members being flush with one another. Said plate 21 is bifurcated and in addition near its middle has a recess 22 to receive the round or ball-like head 23 of a stem 24 which moves in a longitudinal direction through a part 25 of the faucet-body, Figure 1, said stem being screw threaded in the usual manner, not shown, within the part 25, a closure 26 providing against leakage around the stem by any usual packing, not shown. The stem terminates in a valve-wheel 27 by which the plate 21 may be shifted between the two positions shown in Figures 2 and 3.

When the said plate 21 is moved to its innermost position as in Figure 2 the valves are both seated against the water pressure entering the mixing chamber, but when said plate is drawn outwardly as in Figure 3 both valves are free to unseat by pressure of water behind them aided by the spring 17 if that member is used. It is clear that through the adjustment of the plate 21 any bulk of water, both hot and cold, may be delivered but in equal amounts, providing warm water.

Since there can be no variation in the temperatures under such construction I provide means for so doing through the use of a plate 28 mounted eccentrically upon a stem 29 extending through a closure 29', Figure 1, said stem being provided with an operating handle 30 outside said closure. Said plate 28 overlies the plate 21, as best shown in Figure 5, and holds that member down in place. Since it is of the eccentric or cam type, said plate 28 when turned in one direction or the other serves to adjust the valves 8 to an equal extent. That is to say, its edges abut the vertical faces 11, the pressure of water of one of the valves always maintaining contact of that valve with the plate following the movements of the latter while the other valve is positively operated, depending upon the direction in which the plate is turned as is clear. In Figure 3 the continuous lines show the relative positions of the valves in a given position of the plate while the broken lines indicate an exactly opposite position or relation of the same parts, it being understood that in the first named position the right hand valve for hot water, for example, permits a greater amount of hot water to enter than does the left hand valve for cold water and it follows that an adjustment of the handle 30 will provide for any water temperature.

For convenience, there is provided a disc 31, Figures 1 and $2^a$, having varying degrees of temperature indicated thereon, i. e., cold or hot or any range of temperature between the two, there being a pointer or indicator 32 depending from the arm 30 which when moved opposite a given mark registers the temperature of water being delivered from the faucet. Preferably the disc 31 is reversible in position upon the faucet, it being observed that the figures are reversed in position in the named figures of the drawing in order that the pointer may properly indicate the temperatures should the hot and cold water supply pipes be reversed in position as sometimes happens.

It is preferable to provide for a positive control for both waters as provided by the plate 21 and then to operate the valves by other means separate therefrom for producing exact mixtures since thereby more satisfactory results are obtainable. It is clear that just in proportion to the movement of one valve in moving toward its seat, the other will open so that such exact mixture is assured, not overlooking the fact that hot or all cold water may be had independently by a one-quarter rotation of the plate 28 from the position shown in Figure 2 in one direction or the other.

I claim:

1. In a hot and cold water faucet comprised in a single structure, the combination with a mixing chamber, hot and cold water conduits opening into said chamber, and a valve for controlling each conduit, each valve adapted to open into said chamber by pressure of fluid thereagainst, of means for seating both valves simultaneously against the pressure thereon, and a member independent of said means with which both valves engage adapted to shift one of the valves in the one direction and permit the other to shift in the other direction to the same degree simultaneously.

2. In a hot and cold water faucet comprised in a single structure, the combination with a mixing chamber, a hot and a cold water conduit opening into opposite sides of said chamber, and a valve for each conduit, of means in said mixing chamber for engaging and seating the valves simultaneously against pressure thereon, and a single member in said mixing chamber disposed between the valves and engaged by both the latter due to pressures on said valves, said member adapted by its rotation to move one of the valves toward its seat a distance in porportion to the extent of opening movement of the other.

3. In a hot and cold water faucet comprised in a single structure, the combination with a mixing chamber, a hot and a cold water conduit opening into the mixing chamber at opposite sides, and a pair of valves in said mixing chamber each adapted to close toward one of the conduits against pressure therein, of means in said mixing chamber operable from outside the faucet for simultaneously operating said valves, and a member in said chamber also operated from outside the faucet independently of said means, the same being engaged by both valves and adapted to move one of them toward its seat and to permit the other to leave its seat, said member acting to cause the same degree of movement of each valve.

4. In a hot and cold water faucet comprised in a single structure, a mixing chamber, conduits connected into the chamber at opposite sides, a pair of valves in said chamber each for closing one of the conduits against the pressure of the fluid entering said chamber, a fixed plate in said chamber having a guide-way therein to receive an extension of each valve therein, means in the chamber for controlling the valves and for moving them in opposite directions simultaneously, the same comprising a shiftable plate resting upon said fixed plate and operable from outside the faucet, and a rotatable plate resting upon the slidable plate and operated from outside the faucet, adapted to receive the valves against it, said rotatable plate being eccentrically mounted and adapted to positively move one of said valves toward is seat and to permit the other to move away from its seat.

5. In a hot and cold water faucet comprised in a single structure, a mixing chamber, conduits connected into opposite walls thereof, a pair of valves in said chamber adapted to seat in opposite directions against the pressures in said conduits, each valve having an extension and having a pair of substantially vertical faces arranged at different heights, a fixed support extending across the mixing chamber and having a guide-way therein between the valves adapted to receive the extension of each, a wedge-shaped slidable plate lying upon the fixed support and upon a part of each extension of the valves adapted to engage corresponding vertical faces of the valve extensions and a rotatable eccentrically mounted plate lying upon the slidable plate adapted to receive other corresponding vertical faces of the valve extensions thereagainst.

6. A hot and cold water faucet including in its construction a chamber for mixing hot and cold water, conduits opening through opposite walls of the same, a pair of valves in said chamber each adapted to close one of said conduits, each said valve including a tubular extension within its respective conduit, a guide-pin in each conduit to receive the said extension, and a support within the said chamber having a guide-way therein to receive slidably therein an extension of each of the valves.

7. A hot and cold water faucet including in its construction a chamber for mixing hot and cold water, conduits opening through opposite walls of the same, a pair of valves in said chamber each adapted to close one of said conduits, each valve including a tubular extension within its respective conduit, a guide-pin in each conduit to receive the said extension, a support within the said chamber having a guide-way therein to receive slidably therein an extension of each of the valves, and a member within the chamber adapted to operate the valves.

8. A hot and cold water mixing faucet including its body having a mixing chamber, hot and cold water conduits opening into the chamber at opposite sides, a valve for each opening adapted to close upon the same against pressure of fluid entering the chamber through said conduits, means to seat the valves simultaneously and to permit an equal unseating action of each, and separate means to engage the valves and by its action resulting in movement of one valve toward its seat and the movement of the other valve away from its seat.

9. In a hot and cold water mixing faucet, a body having a mixing chamber, hot and cold water conduits opening thereinto opposite each other, a valve within the chamber at each opening to separately close the same, each valve including an extension within the chamber, each having an abutment, one facing the other, each also having a second abutment each also facing the other at a different height and each spaced back from the positions of the first named abutments, a wedge adapted to engage between two of the companion abutments, and an eccentric engaging at its edges the other two abutments.

In testimony whereof I affix my signature.

CHARLES A. MEALS.